United States Patent
Pisciotta (10) Patent No.: US 11,492,713 B2
(45) Date of Patent: Nov. 8, 2022

(54) ENERGY STORAGE SYSTEM FOR METAL UPCYCLING

(71) Applicant: West Chester University, West Chester, PA (US)

(72) Inventor: John M. Pisciotta, West Chester, PA (US)

(73) Assignee: WEST CHESTER UNIVERSITY, West Chester, PA (US)

( * ) Notice: Subject to any disclaimer, the term of this patent is extended or adjusted under 35 U.S.C. 154(b) by 266 days.

(21) Appl. No.: 16/538,198

(22) Filed: Aug. 12, 2019

(65) Prior Publication Data

US 2020/0048780 A1 Feb. 13, 2020

Related U.S. Application Data (60) Provisional application No. 62/717,823, filed on Aug. 11, 2018.

(51) Int. Cl.

| | |
|---|---|
| C25B 9/17 | (2021.01) |
| C25B 9/65 | (2021.01) |
| C02F 1/44 | (2006.01) |
| C25B 11/04 | (2021.01) |
| C02F 1/461 | (2006.01) |
| C25B 15/04 | (2006.01) |
| C25B 1/04 | (2021.01) |
| C25B 9/23 | (2021.01) |
| C25B 9/73 | (2021.01) |
| H02S 40/38 | (2014.01) |

(52) U.S. Cl.
CPC ............... *C25B 9/65* (2021.01); *C02F 1/441* (2013.01); *C02F 1/46109* (2013.01); *C25B 1/04* (2013.01); *C25B 9/23* (2021.01); *C25B 9/73* (2021.01); *C25B 11/04* (2013.01); *C25B 15/04* (2013.01); *B01D 2313/36* (2013.01); *C02F 2001/46133* (2013.01); *H02S 40/38* (2014.12)

(58) Field of Classification Search
CPC .... C25B 1/04; C25B 9/17; C25B 1/55; C25B 1/00; C25B 1/02; C25B 9/00; C25B 9/19; C25B 11/00; C25B 15/08; C25B 15/02; C25B 9/65; C25B 9/30; C25B 9/50; C25B 9/70; C25B 9/77
See application file for complete search history.

(56) References Cited

U.S. PATENT DOCUMENTS

| | | | | |
|---|---|---|---|---|
| 2002/0155330 | A1* | 10/2002 | Tanaka | C25B 9/05 429/422 |
| 2007/0246370 | A1* | 10/2007 | Dimroth | C25B 9/70 205/628 |
| 2015/0197864 | A1* | 7/2015 | Greenbaum | C25B 9/19 204/266 |

* cited by examiner

*Primary Examiner* — Zulmariam Mendez
(74) *Attorney, Agent, or Firm* — Stradley Ronon Stevens & Young, LLP (57) ABSTRACT

A device for generating hydrogen gas, treated water, and metal-containing nanoparticles. The device includes a vessel containing an electrolyte solution having a preferably iron anode and a preferably copper cathode. A renewable energy source is connected to the anode and the cathode. A valve for disbursing the hydrogen is connected to the hydrogen chamber.

18 Claims, 7 Drawing Sheets

ENERGY STORAGE SYSTEM FOR METAL UPCYCLING

RELATED APPLICATION

This application claims the benefit of priority to U.S. Provisional Patent Application Ser. No. 62/717,823, filed on Aug. 11, 2018, the contents of which are incorporated in this application by reference.

STATEMENT REGARDING FEDERALLY SPONSORED RESEARCH

This invention was made with government support under Grant No. SU836778 awarded by the Environmental Protection Agency. The government has certain rights in the invention.

FIELD OF THE INVENTION

The invention relates to solar generators, and more particularly, to a solar generator that disinfects water and generates useful products by upscaling electrode metals.

BACKGROUND OF THE DISCLOSURE

Many rural agricultural areas around the world lack access to an electric power grid or clean water supply.

Renewable energy is non-polluting and can be generated using known technologies including photovoltaic (PV) panels and wind turbines. Unfortunately, the sun sets and the wind does not always blow. As a result, the main drawback of renewable electricity is that it cannot be easily and efficiently stored without batteries. Storage of renewable energy in batteries is costly, however, and disposal of old batteries can result in toxic heavy metal contamination. Furthermore, pumped hydraulic storage into large reservoirs is inconvenient and not cost effective at the household to village level.

Electrolysis of water is another common energy storage approach that stores generated electricity as hydrogen gas. Unfortunately, conventional water electrolysis is inefficient due to high over-potential as demonstrated by Equation 100 below, necessitating expensive electrode catalysts, such as the precious metal platinum (Pt).

Cathode $110H^+_{(aq)} + 2e^- \rightarrow H_{2(g)} (E^0 = 0.00$ V vs. SHE)

Anode $H_2O_{(l)} \rightarrow \frac{1}{2}O_{2(g)} + H^+_{(aq)} + 2e^- (E^0 = 1.23$ V vs. SHE)

Overall $H_2O \rightarrow H_2 + \frac{1}{2}O_2 (E_0 = -1.23$ V vs. SHE)

In addition to being an energy intensive process, conventional water electrolysis does not provide benefits beyond $H_2$ formation (i.e., disinfecting water or upscaling waste metals). The release of $O_2$ from the anode during water electrolysis may also be a liability for some applications. For example, when using $H_2$ to promote strictly anaerobic biological processes, such as the cultivation of certain microbes. Furthermore, mixtures of $H_2$ and $O_2$ are explosive.

Recently, progress has been made in alkaline electrolyte systems, which feature reduced over-potentials, using less costly nickel electrodes. However, these systems require the use of a strong alkaline electrolyte such as potassium hydroxide (KOH). Strong bases contribute to cost and may not be readily and/or safely available in small-scale settings seeking to store renewable energy.

Polymer electrolyte membranes (PEMs) such as Nafion® represent another costly component that adds complexity to another leading type of acid electrolyte electrolyzers. Again, most existing electrolyzers generally do not produce useful products in addition to hydrogen. Indeed, the goal of most electrolysis researchers has traditionally been to minimize or eliminate wasteful electrode corrosion. This is one reason that Pt, which has a very low reactivity, is often used in electrolyzers.

Accordingly, there is a need for a low cost and efficient system for storing renewable energy as hydrogen that does not require costly membranes or metals but rather works well with inexpensive, easily identifiable scrap metals such as copper, zinc, or iron. Furthermore, such a system should provide for useful, additional applications such as disinfection of waterborne pathogens and synthesis of useful, nanomaterials of greater value than the starting electrode metals.

SUMMARY OF THE INVENTION

The disclosed device addresses the need for a low cost and efficient system for storing renewable energy while at the same time providing useful, additional applications such as disinfection of waterborne pathogens and synthesis of useful nanomaterials.

Advantageously, the hydrogen generation system may be configured to generate hydrogen gas using only renewable sources of energy while at the same time purifying water. Further, the generation system is deployable in a vessel, and may provide a simple single chamber or membrane-defined, multiple chamber structure for keeping the hydrogen gas separated and contained.

In one embodiment, the system uses common, inexpensive scrap metals like copper (cathode) and zinc (anode) as the proton reduction catalyst and highly reduced, sacrificial electron source, respectively. While most existing electrolyzers seek to avert "wasteful" electrode corrosion, this device facilitates it. This electrode sacrifice enables additional applications not normally associated with an energy storage apparatus including desalination, nano-material synthesis, and water disinfection. Indeed, metal ions liberated from electrodes may serve a plurality of functions such as ion-mediated disinfection of microbial pathogens and formation of oxidized metal-containing mineral precipitates that are of greater value and different functionalities than the starting metals alone. As a result, this system can be used to not only provide stored energy but also disinfect water and produce more valuable materials than the metals in the original starting electrodes.

In one embodiment, the system includes a vessel containing an electrolyte solution having an anode and a cathode. A membrane separates the vessel into a cathode chamber and an anode chamber with the cathode located below the hydrogen chamber and the anode located below the anode chamber. A photovoltaic cell is connected to the anode and the cathode. Finally, a valve for dispensing the hydrogen gas is connected to the cathode chamber.

In certain embodiments, the anode is iron and the cathode is copper. Furthermore, the electrolyte solution may be a mixture of water and an acid or salt.

In a further embodiments, the vessel includes a treated water outlet connected to or located below a membrane such as a reverse osmosis membrane. In such embodiments, increased gas pressure in the headspace above forces the water through the membrane treating it.

In other embodiments, the vessel includes at least one piston rod in communication with the hydrogen chamber.

Upon the increase of the gas pressure in the hydrogen chamber, the piston rod is adapted to exert a mechanical force on one side of the photovoltaic cell. The photovoltaic cell may also include a hinge on the side opposite the side upon which the piston rod exerts the mechanical force. The hinge may assist in directing the mechanical force.

In certain embodiments, the vessel further includes a transparent bladder containing the anode, cathode, and electrolyte solution. In such embodiments, the vessel may also contain the photovoltaic cell. The bladder may also be arranged so that the electrolyte acts to concentrate light rays onto the photovoltaic cell. Furthermore, the vessel may include a transparent lid and lens structure adapted to concentrate light rays onto the photovoltaic cell.

In further embodiments, a real time positioning element and location transmitter are attached to the vessel and a storage bladder is attached to the valve. Such embodiments may permit the device to be released into the sea to evaluate ocean climates and currents.

In other embodiments, the electrical source is adapted to provide more than about 5, about 10, or about 15 volts of electricity for greater than 10 minutes.

In certain embodiments, a method for generating hydrogen gas, disinfected water, and tribasic copper chloride is disclosed. The method comprises six steps. First, an electrolyte solution comprising a mixture of water and an acid or salt is placed into a vessel containing a membrane defining two chambers with an anode located below one chamber and a cathode located below the second chamber. Second, the anode and cathode are connected to an electrical source selected from the group consisting of a photovoltaic cell, a wind turbine, a hydro turbine, and combinations thereof. Third, the electrical source applies more than 5 volts of electricity to the electrolyte solution for more than 10 minutes, thereby creating a copper precipitate. Fourth, the anode and cathode are disconnected from the electrical source. Fifth, the electrolyte solution is removed from the vessel. Sixth, the copper precipitate is collected.

In certain embodiments, the electrical source is adapted to provide a periodic polarity inversion.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

When referring to the drawing, like reference numbers refer to like elements throughout the various figures that comprise the drawing.

DETAILED DESCRIPTION

Figure 1:
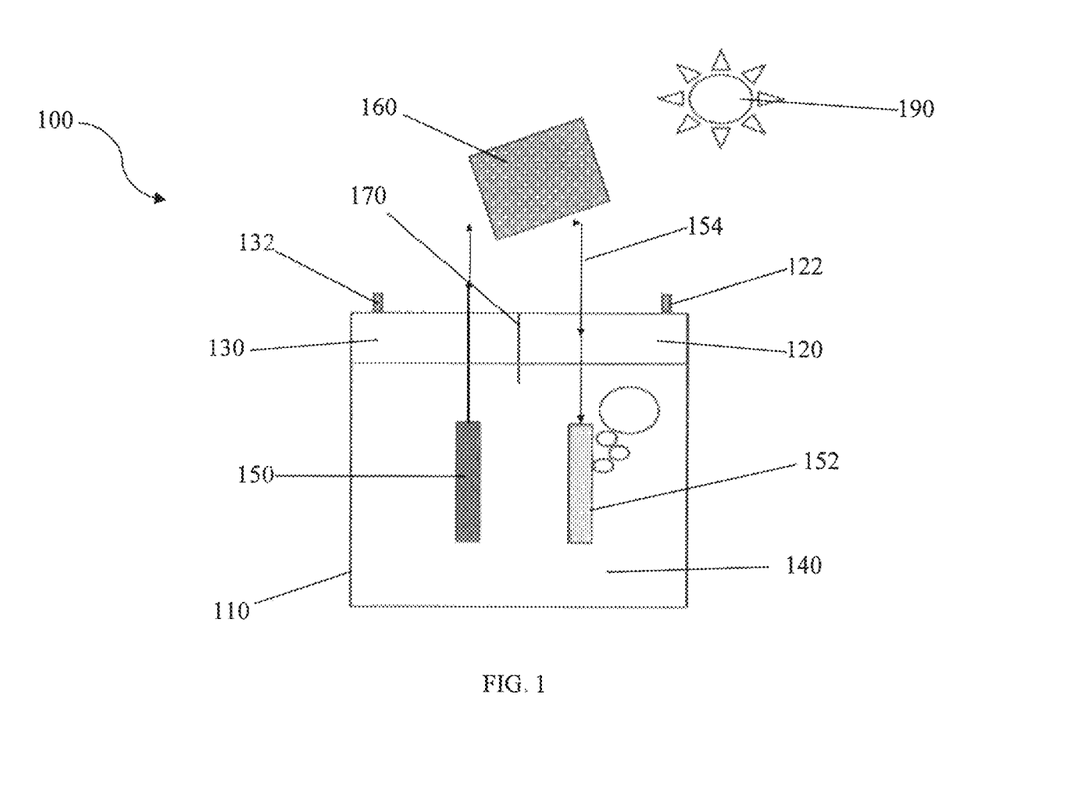
FIG. 1 is one embodiment of the present invention.
Figure 2:
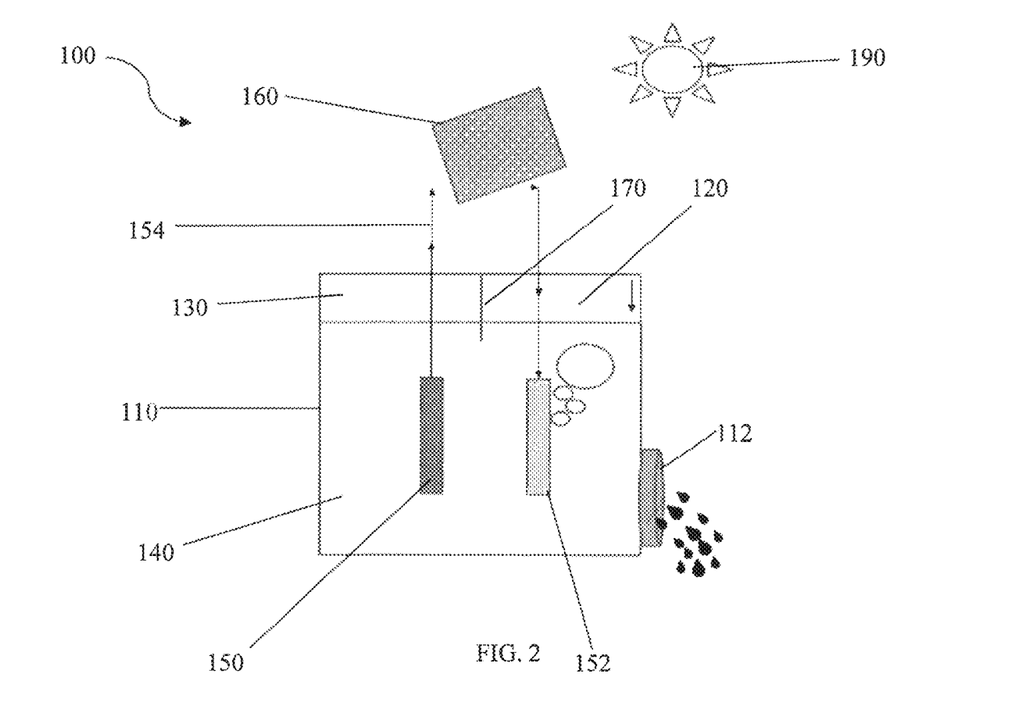
FIG. 2 is one embodiment of the present invention.
Figure 3:
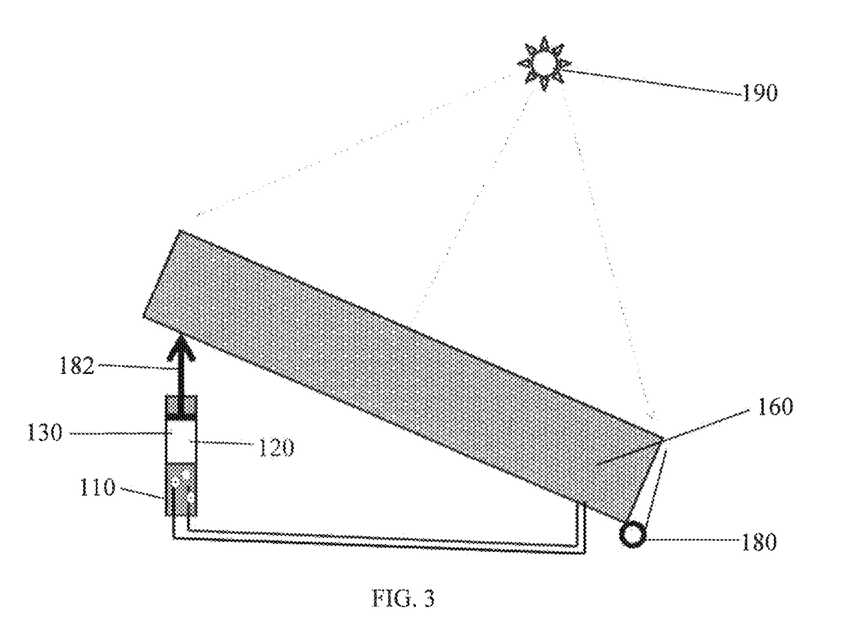
FIG. 3 is one embodiment of the present invention.

The disclosed generation system 100 includes a vessel 110 which holds an electrolyte solution 140. In one embodiment, the electrolyte solution 140 is a mixture of water and an electrolyte, such as an acid. In another embodiment, the electrolyte solution 140 is salt water. It will be appreciated that other electrolyte solutions may be used consistent with this disclosure. The vessel may include a septa or membrane 170 which is arranged to form a hydrogen chamber 120. A volume space above the electrolyte 140 level enables collection of hydrogen gas. The volume space may also include an anode headspace chamber 130 for collecting anode-generated gas possibly formed at elevated voltage.

Two electrodes are placed in the electrolyte solution 140. A cathode 152 is positioned below the hydrogen chamber 120, and an anode 150 is positioned below the anode chamber 130, if any. An electric source 160 is coupled to the cathode 152 and the anode 150, which causes an electrolytic metal corrosion process.

The electric source 160 is preferably a renewable electricity source, such as a photovoltaic cell, wind turbine, or hydro turbine, that engages an energy source such as the sun 190. As a result, the generation system 100 is environmentally friendly, and may be used to generate hydrogen in a wide variety of locations.

The generated electricity is applied to the anode 150 and the cathode 152 in the electrolyte solution 140. The metal electrolysis process oxidizes the sacrificial anode as a source of electrons, with hydrogen gas forming at the cathode 152, and metal ions released at the anode 150. The membrane 170 partitions the hydrogen gas. The respective gases bubble through the electrolyte solution 140, and the hydrogen gas collects in the hydrogen chamber 120, while anode-generated gas collects in the anode-generated gas chamber 130, if any. A hydrogen outlet 122 is used to exhaust hydrogen gas, and an anode-generated gas outlet 132 is used to exhaust possible anode-generated gas.

Vessel

The generator system 100 includes the vessel 110. The vessel 110 may be constructed of rigid material such as plastic or glass. In non-limiting embodiments such materials may include polyethylene ("PET"), high density polyethylene (HDPE), polyethylene naphthalate ("PEN"), high density polyethylene (HDPE), low density polyethylene (LDPE), polypropylene (PP), polyvinyl chloride (PVC), thermoplastic elastomers (TPE), acrylonitrile butadiene styrene (ABS), polyphenylene oxide (PPO), nylon/polyamides (PA), polycarbonate (PC), or combinations thereof.

The vessel 110 may take on many other sizes and shapes, such a circular, oval, trapezoidal, or triangular.

In certain embodiments, the vessel 110 includes a lid adapted to permit the vessel 110 to be opened and closed to permit the generator system 100 to operate in a batch mode. In such embodiments, the vessel 110 may be sealed with the lid and operated in a batch mode.

In certain embodiments, the vessel 110 includes a purified water outlet 112. The purified water outlet 112 will be below the hydrogen outlet 122 and adapted to direct water to a storage tank. A membrane, such as a reverse osmosis membrane, may be attached to the purified water outlet 112 to prevent contaminated water from flowing out of the vessel 110.

In certain embodiments, the vessel 110 includes a contaminated water inlet. The contaminated water inlet is adapted to permit untreated water to be added to the vessel 110 without removing the lid. As a result, the vessel 110 may be opened for partial refilling so as to operate in a semi-batch mode.

In certain embodiments, the vessel 110 has both a contaminated water inlet and a purified water outlet 112. Such embodiments may be operated in a continuous flow mode.

Electrolyte

The vessel 110 includes the electrolyte solution 140. In one embodiment, the electrolyte solution 140 is salt water. Other types of electrolytes may also be employed. Indeed, the electrolyte solution 140 may be selected from the group consisting of potassium hydroxide or non-aqueous electrolytes.

Gas Membrane

The vessel 110 includes the gas membrane 170 for trapping the hydrogen gas. The gas membrane 170 is selected to restrict the passage of the hydrogen gas. In this way, the membrane 170 acts to trap or confine hydrogen gas in the hydrogen chamber 120. The membrane 170 may also restrict the passage of anode-generated gas, and thereby keeps the hydrogen gas from mixing with anode-generated gas in the anode-generated gas chamber 130. The membrane 170 may also be selected to facilitate the electrolysis process. For example, the membrane 170 may be a proton-exchange membrane that allows protons to pass during the electrolysis process. It will be appreciated that the composition, characteristics, and dimensions of the membrane 170 may be selected according to specific electrolysis requirements. Preferably, the same membrane 170 is used for controlling the electrolysis process and for trapping the hydrogen gas, although separate membranes may be used.

Anode and Cathode Materials

The generator system 100 includes the anode 150 and the cathode 152 contained within the vessel 110 and connected to the electric source 160.

The connections between the electric source 160 and the electrodes 150 and 152 is accomplished by using wires 154 or strips of copper or other conductive materials, including composite conductors. When two metal electrodes (i.e., the cathode 152 and the anode 150) are connected via the electric source 160 and the electrolyte 140 inside the vessel 110, the anode 150 undergoes oxidation which liberates electrons into and through the circuit to the cathode 152. The electrons reduce protons at the cathode 152 to form $H_2$ gas which bubbles out of solution and collects under increasing pressure. $H_2$ (energy) is stored in the hydrogen chamber 120. This $H_2$ can be released via a valve such as the hydrogen outlet 122 to do useful work either via oxidation and/or by way of the gas pressure. Metal ions may also be released into solution from the electrodes and react to form insoluble minerals which sediment out of solution at the bottom of the vessel 110.

In certain embodiments the material of the electrodes 150, and 152 is selected from the group consisting of magnesium, aluminum, zinc, iron, tin, copper, and combinations thereof. For example, the anode 150 may be iron and the cathode 152 may be copper. In such an embodiment, the generator system 100 stores electrical energy as $H_2$ gas the hydrogen chamber 120 of the vessel 110 while providing beneficial metal upcycling by removal of ions, such as $Cl^-$, from seawater by facilitating formation of an insoluble mineral precipitate (e.g., $Cu_2(OH)_3Cl$). Certain polymer composite electrodes may also be introduced into these embodiments. As a result, the generator system 100 may assist with desalinization of seawater.

In other embodiments, different electrode metals are used in sequence to produce nanomaterials that contain multiple different metals, possibly around a common core. Again, such an onion-like approach, possibly involving electrode polarity reversal, may assist in water purification.

Energy Source

The generation system 100 uses electric energy that is generated by the electric source 160 that is either inside or outside the vessel 110.

In certain embodiments, the electric source 160 may be photovoltaic cells, a wind turbine, or a hydro turbine placed a distance from the vessel. Such electric sources 160 may be used individually, or in any combination. For example, the electric source 160 may include both a photovoltaic cell and a wind turbine.

In another embodiment, the generation system 100 uses an electric source 160 which is internal to the vessel 110. For example, the electric source 160 may be photovoltaic cell or panel connected to the cathode 152 and the anode 150 that reside within the vessel 110. In such an embodiment, the vessel 110 may include a transparent portion for allowing light rays to project onto the photovoltaic cell. A solar panel may even be placed in the electrolyte solution 140.

In certain embodiments the vessel may include a transparent bladder adapted to use the electrolyte solution 140 to concentrate light rays onto the solar panel. In such embodiments, the bladder is shaped like a convex lens pointing towards the bottom of the vessel 110 where the solar panel resides.

The electric source 160 may also include switching controls for selectively coupling the electric source 160 to the anode 150 and the cathode 152. For example, the switching controls may be set to allow the solar panel to provide power during the day, but switch to a wind turbine during periods of insufficient light (e.g., during the night).

The generation system 100 applies electrical energy, preferably from a renewable source, into a vessel 110 or case for photo-electrochemical hydrogen production. In certain embodiments multiple electrical sources 160 are linked to achieve voltages in excess of about 5 volts, about 10 volts, or about 15 volts. Such high voltages may assist with water purification.

Gauges

In yet another modification of the generator system 100, the vessel 110 may be fitted with a thermometer, a pressure gauge, or both that may be located in either the anode chamber 130 or the hydrogen chamber 120. Furthermore, the vessel 110 may include volume demarcations, such as would be noted in an inverted graduated cylinder. With such volume demarcations, it would be possible to calculate the amount of stored $H_2$ (and energy) according to the ideal gas law, $PV=nRT$.

In another embodiment, a GPS sensor may be attached to the generator system 100. Such an embodiment would permit the generator system 100 to be placed in the ocean and would permit the generator system 100 to track ocean currents. Indeed, after a set time-period, a solar panel circuit could be completed by an existing known circuit connection (e.g. a timed mechanical spring). Hydrogen thus formed in the sunlit daytime from the cathode 152 could fill an elastic reservoir (i.e., an upper balloon) by a one-way valve. Once the anode 150 dissolves sufficiently away and weight of the device is reduced sufficiently, the generator system 100 could ascend into the atmosphere as a hydrogen balloon or powered drone. From such a height, ocean data signals could be relayed to a monitoring ship via a transmitter, possible powered by the accumulated hydrogen via an onboard fuel cell.

Pistons

In yet another embodiment, which may involve traditional water electrolysis, the energy generator system 100 harnesses the stored energy reserve (i.e., the $H_2$) to inflate the chambers 120 or 130 or extend one or more piston rods 182 so as to move the electric source 160 into a more advantageous position. Such movement may be assisted by one or more hinges 180 attached to the electric source 160. In such an embodiment, the piston rods 182 may be adapted to move a solar panel such that the panel continually faces the sun. Such a configuration would permit the energy generation system 100 to store the additional solar energy chemically in the hydrogen chamber 120 which may itself be used to pneumatically actuate the solar panels to face the sun for additional electricity generation 190.

For optimal solar energy conversion per square meter of illuminated PV panel surface area, PV panels must directly face the sun throughout the course of the day. Due to the rotation of the Earth, this currently necessitates inclusion of costly solar tracking mechanism such as motors and electronic processors. Such single or dual axis tracking elements are vulnerable to the elements and prone to failure. This embodiment addresses the solar tracking problem while addressing the energy storage problem in a manner which, in so doing, provides for a host of system benefits to meet existing needs. Specifically, this elegant arrangement lowers both the cost and the weight of a sun-tracking solar energy conversion and storage system by obviating the need for heavy, expensive batteries and motors. It is apparent that an internal or external spring, or other elastic means, may be included to return the piston(s) to the original compressed position when the energy storage gas is vented, for instance at day's end. Gas venting and/or interruption of the electric circuit can be used to adjust solar tracking rate. While passive gas trackers do exist, these cannot be electrically governed and they also do not store solar energy in a form like hydrogen that can be converted back to electricity on demand as with a fuel cell.

Water Treatment

In certain embodiments the generator system 100 is adapted to provide desalination of salt water. In such embodiments, $H_2$ gas accumulates and is stored in a rigid (i.e., non-elastic) hydrogen chamber 120. The downward force exerted by the $H_2$ on the surface of the electrolyte solution 140 would cause a rise in headspace gas pressure. This force may then be used to drive a useful process such as water filtration or reverse dialysis through one or more lower filters and/or ion exchange membrane(s) which may be attached to or located above the purified water outlet 112. Such an embodiment would assist in the removal of ions such as $Na^+$ from an electrolyte such as seawater. It is noted that metal containing precipitates (ex. TBCC) may further facilitate this process by removing and sedimenting $Cl^-$.

Figure 4A:
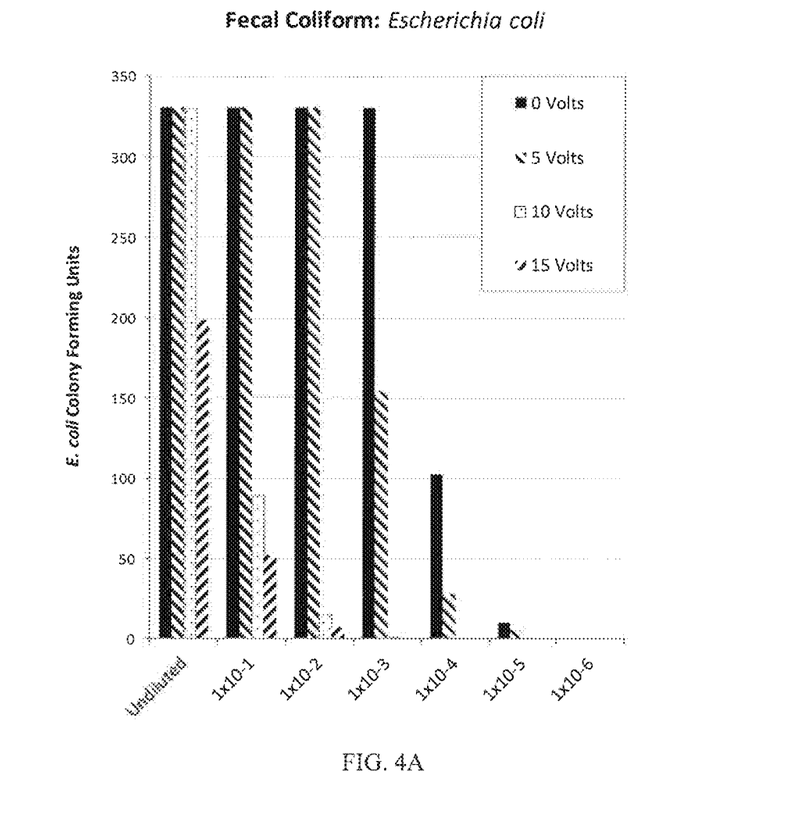
FIG. 4A is a graphical depiction of the reduction in *Escherichia coli* colony forming units in the system electrolytes after ten minutes of being exposed to different voltages.
Figure 4B:
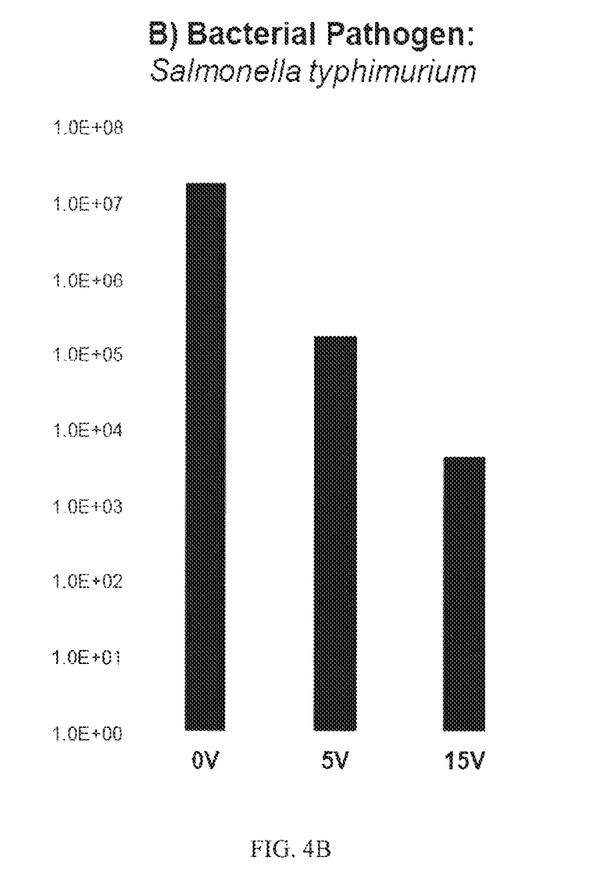
FIG. 4B is a graphical depiction of the reduction in *Salmonella typhimurium* colony forming units in the system electrolytes after ten minutes of being exposed to different voltages.
Figure 4C:
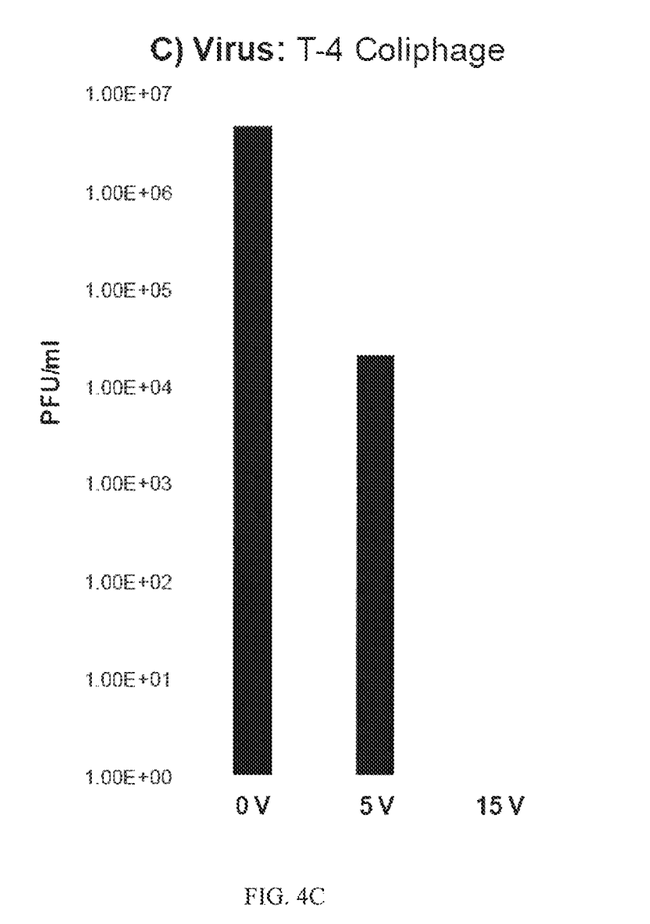
FIG. 4C is a graphical depiction of the reduction in T-4 coliphage colony forming units in the system electrolytes after ten minutes of being exposed to different voltages.

In certain embodiments the generator system 100 is adapted to treat the water and remove harmful pathogens—specifically pathogenic bacteria, and viruses. Such disinfection is accomplished through an increase in the voltage passing through the electrolyte solution 140 and the attendant formation of anti-microbial compounds. Indeed, FIGS. 4A, 4B, and 4C outline the experimental findings showing the system's anti-bacterial and anti-viral action after 10 minutes at 0, 5, 10, or 15 volts. Indeed, after just 10 minutes at 15 volts the pathogen population within the water is almost entirely eradicated.

Hydrogen Generation

In certain embodiments, the generation system 100 provides sufficiently pure hydrogen gas without complex gas separation equipment. Instead, the generation system 100 uses a simple gas membrane 170 to keep the hydrogen separated from other gases, which enables the efficient collection of commercial grade hydrogen gas using known gas-processing techniques.

Significantly, the generation system 100 provides a single vessel 110 for producing commercial grade hydrogen. In certain embodiments, the electric source 160 generates electricity that drives a metal electrolysis process, while the gas membrane 170 traps the hydrogen gas. Hydrogen gas may be exhausted through the hydrogen outlet 122 into known containment or transport structures for storage or use. For example, the generation system 100 could include a hydrogen storage tank for collecting hydrogen gas. The hydrogen may be piped to a fuel-cell where the hydrogen gas is converted into electricity as needed. In this way, the generation system 100 enables the generation and storage of energy from renewable sources, such as solar, hydro, and wind, when those sources are available. At other times, for example when it is dark and there is no wind, the fuel cell uses the stored hydrogen energy to produce electricity.

With the hydrogen molecules stored, their potential energy exists for future use. Employing fuel cells, hydrogen and atmospheric oxygen may be reacted to generate clean electrical energy that is free of fossil fuel and pollution. Such fuel cell-produced energy is used as electricity for homes, business, industry, as well as to power automobiles and trucks. Hydrogen may also be used in industry as fuel for combustion purposes that yields no pollution or residue.

The generation system 100 also may include local storage of generated hydrogen gas. In certain embodiments, the gas may be stored in a flexible bladder storage unit. The bladder has an outer layer that will preferably be a composite polymer layer as padding to protect the entire storage unit. A strong layer, including fibers, will serve as a base for an inner layer. An inner coating will include polymer material capable of preventing hydrogen dispersion through the wall of the storage unit. As a result, this bladder will be constructed for storing and carrying a chemically aggressive gas such as hydrogen.

Metal Upcycling Formation

In other possible embodiments, the invention is adapted for energy storage plus processing (i.e., size exclusion screening and drying) of a nanomaterial that matches a user-defined set of parameters. For this application, the accumulated headspace gas would press the electrolyte containing the sediment nanomaterial through one or more sets of progressively finer filters. In this way nanoparticles of different sizes can be separated. The nanomaterial would settle on the bottom of the vessel 110 thereby permitting the user to harvest the upcycled metal.

Figure 5:
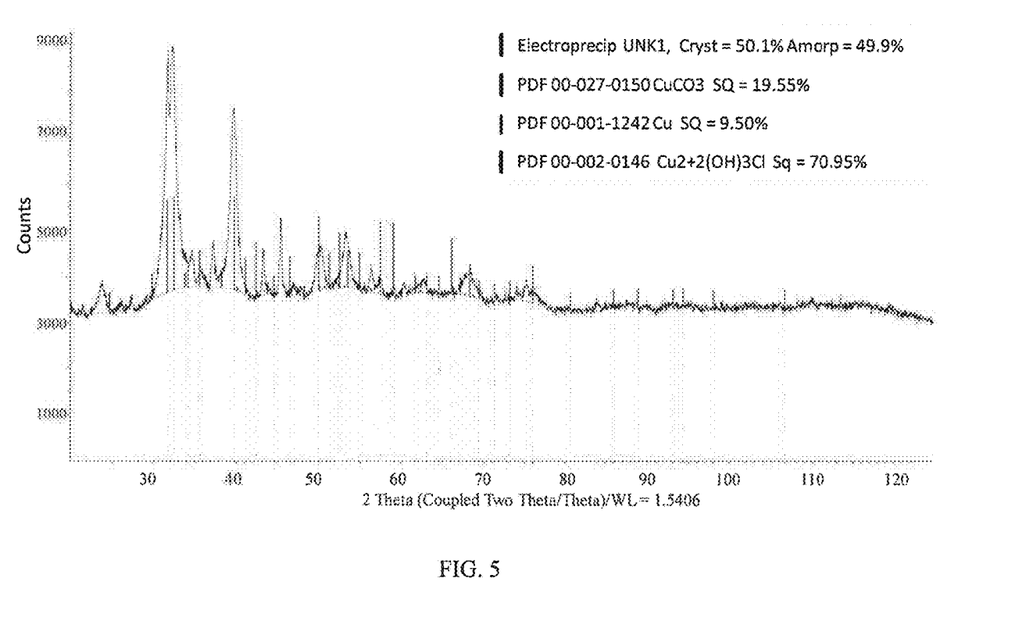
FIG. 5 is an X-ray diffraction analysis of a precipitate formed in an embodiment of the present invention using copper as a cathode material and iron as an anode material.

For example, as depicted in FIG. 5, when the cathode 152 is copper and the electrolyte solution 140 is salt water, $Cu_2(OH)_3Cl$, also referred to as tribasic copper chloride (TBCC), is formed. The global market for TBCC was $248 million in 2015 and is predicted to grow to $333-$343 million by 2023. Furthermore, one of the fastest growing applications for TBCC is as a growth-promoting antimicrobial feed supplement for poultry and livestock. Indeed, as companies are increasingly distancing themselves from conventional agricultural antibiotics, safe and effective alternatives like TBCC are increasingly being embraced. Use of alternatives to antibiotics, like TBCC, in the food industry may also help to slow the rise of antibiotic-resistant "superbugs". As a result, the generator system 100 not only provides energy, and treated water, but it also provides a relatively more oxidized widely used agro-chemical product that is of greater value than the highly reduced metal consumed.

Simply put, no existing product stores energy while generating useful product(s) for value upcycling of waste metals while concurrently disinfecting water. Indeed, the May, 2017 spot price for copper (Cu) was $5.49 per kg whereas TBCC is roughly $22/kg. This suggests a potential fourfold (4×) upcycling in value.

Value upcycling is further enhanced as by the reaction chemistry of the product formation. This is because less than one gram of metal is needed to form a gram of product. For example, for TBCC the reaction stoichiometry shown below reveals that for every 0.59 gram of copper invested, 100 grams of product may be produced:

$$8Cu+3O_2+4Cl+6H_2O=4Cu_2(OH)_3Cl.$$

This provides for a further value upcycling of 1.7 fold since 40.5% of every gram of product is not metal but rather oxygen, hydrogen, and chloride which can be supplied by inexpensive table salt or even seawater. As noted, removal of Cl from saltwater into product can facilitate desalination. The mass of the reactants required for each gram of product formed is shown in the Table I below:

TABLE 1

| Reactants | Initial Amount Required (mole) | Initial Amount Required (gram) |
|---|---|---|
| Cu | 0.00936 | 0.59479 |
| $O_2$ | 0.00351 | 0.11231 |
| Cl | 0.00468 | 0.16591 |
| $H_2O$ | 0.00702 | 0.12647 |

Placing the above in context, 100 kg of product can be obtained from 0.59 kg Cu. Using 100 kg of Cu yields 1.695 kg of product, which based on the 2017 price yields $37.29 in gross product value. As Cu costs $5.49/kg, the product net value (i.e., $37.29–$5.49) is a $31.80 gain, not considering the cost of solar panels, drying and further processing or formulation. Depending of formulation and binders used, however, value could be further increased as TBCC is typically applied to plants at a 10%-59% concentration.

The disclosed generation system 100 is also scalable. It is easily mass produced and arranged in multiple units, thus reducing the overall cost to the consumer.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention.

What is claimed is:

1. A device for generating hydrogen gas and $Cu_2(OH)_3Cl$ (TBCC), comprising:
   a vessel containing:
      an electrolyte solution, an anode and a cathode, wherein the cathode is copper, and the electrolyte is a mixture of water and an acid or salt;
      a membrane separating the vessel into a hydrogen chamber and an anode chamber, the cathode located below the hydrogen chamber and the anode located below the anode chamber;
   an electrical source connected to the anode and the cathode adapted to provide greater than 5 volts of power; and
   a valve connected to the hydrogen chamber,
   wherein, the anode is subject to metal electrolysis resulting in the production of the hydrogen.

2. The device according to claim 1, wherein the anode is iron.

3. The device according to claim 1, wherein the vessel further comprises a reverse osmosis membrane and a purified water outlet is connected to or located below the reverse osmosis membrane.

4. The device according to claim 1, wherein the vessel further comprises at least one piston rod in communication with the hydrogen chamber or the anode chamber and the piston rod is adapted to exert a mechanical force on one side of the electrical source upon the increase of the gas pressure in the hydrogen chamber or the anode chamber.

5. The device according to claim 4, wherein the electrical source includes a hinge on the side opposite the side upon which the piston rod exerts the mechanical force.

6. The device according to claim 1, the vessel containing the electrical source and an electrolyte solution adapted to concentrate light rays onto the electrical source.

7. The device according to claim 1, further comprising a real time positioning element and location transmitter attached to the vessel and a storage bladder attached to the valve.

8. The device according to claim 1, wherein the electrical source is adapted to provide more than 10 volts of electricity.

9. A device for solar tracking by storing energy, the device comprising:
   a vessel containing
      an electrolyte solution comprising a mixture of water and an acid or salt,
      an anode comprising iron,
      a cathode comprising copper, and
      a membrane separating the device into a hydrogen chamber and an anode chamber, the cathode located below the hydrogen chamber and the anode located below the anode chamber;
   an electrical source selected from the group consisting of a photovoltaic cell, a wind turbine, a hydro turbine, and combinations thereof adapted to provide greater than 5 volts of power, wherein the electrical source is connected to the anode and the cathode; and
   a valve connected to the hydrogen chamber,
   wherein, the anode is subject to metal electrolysis resulting in the production of hydrogen and $Cu_2(OH)_3Cl$ (TBCC).

10. The device according to claim 9, further comprising a membrane separating the vessel into a hydrogen chamber and an anode chamber, the cathode located below the hydrogen chamber and the anode located below the anode chamber.

11. The device according to claim 10, wherein the vessel further comprises a reverse osmosis membrane and a treated water outlet connected to or located below the reverse osmosis membrane.

12. The device according to claim 9, wherein the vessel further comprises
   at least one piston rod in communication with the hydrogen chamber or the anode chamber and the piston rod is adapted to exert a mechanical force on the electrical source, wherein the hydrogen produced is adapted to exert a mechanical force on the piston rod while simultaneously storing energy.

13. The device according to claim 12, wherein the electrical source includes a hinge adapted to direct the mechanical force imparted by the piston rod.

14. The device according to claim 9, wherein the electrical source comprises a photovoltaic cell contained within the vessel, and the electrolyte solution is adapted to concentrate light rays onto the photovoltaic cell.

15. The device according to claim 9, further comprising a real time positioning element and location transmitter attached to the vessel and a storage bladder attached to the valve.

16. The device according to claim 9, wherein the electrical source is adapted to provide more than 10 volts of electricity.

17. A method for generating hydrogen gas, treated water, and metal-containing nanoparticles, the method comprising:
 placing an electrolyte solution comprising a mixture of water and an acid or salt into a vessel containing a membrane defining two chambers with an anode comprised of iron located below one chamber and a cathode comprised of copper located below the second chamber;
 connecting the anode and cathode to an electrical source selected from the group consisting of a photovoltaic cell, a wind turbine, a hydro turbine, and combinations thereof;
 applying more than 5 volts of electricity to the electrolyte solution for more than 10 minutes thereby creating $Cu_2(OH)_3Cl$ (TBCC);
 disconnecting the anode and cathode from the electrical source;
 removing the electrolyte solution; and
 collecting the TBCC.

18. The method according to claim 17, wherein the electrical source is adapted to provide a periodic polarity inversion.

* * * * *